(12) United States Patent
Droll et al.

(10) Patent No.: US 6,744,159 B2
(45) Date of Patent: Jun. 1, 2004

(54) ARMATURE FOR AN ELECTRIC MACHINE

(75) Inventors: Bruno Droll, Buehl-Altschweier (DE); Martin Karl, Sasbachwalden (DE); Martin Goedecke, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/129,935

(22) PCT Filed: Aug. 24, 2001

(86) PCT No.: PCT/DE01/03245
§ 371 (c)(1),
(2), (4) Date: Aug. 5, 2002

(87) PCT Pub. No.: WO02/23695
PCT Pub. Date: Mar. 21, 2002

(65) Prior Publication Data
US 2003/0020362 A1 Jan. 30, 2003

(30) Foreign Application Priority Data
Sep. 13, 2000 (DE) .......................................... 100 45 222

(51) Int. Cl.[7] ................................................. H02K 7/00
(52) U.S. Cl. ....................................... 310/67 R; 310/91
(58) Field of Search ................................. 310/67 R, 91, 310/90, 66

(56) References Cited

U.S. PATENT DOCUMENTS

| | | | | | |
|---|---|---|---|---|---|
| 4,339,873 | A | * | 7/1982 | Kanamaru et al. | 29/598 |
| 4,591,749 | A | * | 5/1986 | Gauthier et al. | 310/156.19 |
| 4,886,392 | A | * | 12/1989 | Iio | 403/282 |
| 5,625,511 | A | | 4/1997 | Brooks et al. | 310/42 |
| 6,465,916 | B1 | * | 10/2002 | Aoshima | 310/49 R |

FOREIGN PATENT DOCUMENTS

FR 2 144 403 * 9/1973 ........... F16H/55/00

* cited by examiner

Primary Examiner—Burton S. Mullins
Assistant Examiner—Nguyen Hanh
(74) Attorney, Agent, or Firm—Ronald E. Greigg

(57) ABSTRACT

An armature of the invention has a component, to be mounted on the shaft, that has a protrusion in the internal diameter; the protrusion engages a knurled feature on the shaft, and the initial stresses can lessen at least in part over the course of time.

6 Claims, 1 Drawing Sheet

ARMATURE FOR AN ELECTRIC MACHINE

CROSS-REFERENCE TO RELATED APPLICATIONS

This application is a 35 USC 371 application of PCT/DE 01/03245 filed on Aug. 24, 2001.

BACKGROUND OF THE INVENTION

1. Field of the Invention

The invention is directed to an improved armature for an electrical machine.

2. Description of the Prior Art

From U.S. Pat. No. 4,886,392, a rotor with a shaft that has a knurled feature and smooth regions on a surface of the shaft is already known; the shaft has approximately the same external diameter both in the region of the knurled feature and in the smooth regions. The rotor, which is slipped onto the shaft, however, has no taper in the internal diameter, which is disposed in the region of the knurled feature.

From U.S. Pat. No. 5,625,511, a stator with a shaft is known, in the middle of which shaft a knurled feature is provided. On the far side of the knurled feature on the shaft there is a smooth region, which has the same external diameter as the knurled feature and can be used to guide the stator, which is secured on the shaft. The stator, however, has no taper in the internal diameter, which is disposed in the region of the knurled feature.

From the book entitled *"Feinmechanische Bauelemente"* ["Precision-Mechanical Components"] by Prof. Dr.-Ing. S. Hildebrandt, Carl Hanser Verlag, Munich, page 221, it is known to use a shaft with a knurled feature; the knurled feature has an external diameter larger than an internal diameter of a component that is slipped onto the shaft in the region of the knurled feature and secured there. The component is mechanically softer than the shaft and presses into the knurled feature of the shaft, resulting in a reinforcement by positive engagement. Outside the knurled feature, the external diameter of the shaft is smaller than the internal diameter of the component.

U.S. Pat. No. 4,339,873 shows a rotor shaft that has an indentation in which a knurled feature is disposed. The component that is slipped onto the rotor shaft is disposed with its taper in the region of the knurled feature, in the installed state. The taper, however, is created by plastic deformation of the component, after the component has been slipped onto the shaft.

SUMMARY OF THE INVENTION

The armature of the invention has the advantage over the prior art that in a simple way, a component can be mounted on a shaft and securely held. Also, because of the protrusion in the internal diameter of the component, the material of the component deforms plastically in the region of the protrusion and flows into the knurled feature and thus develops a positive engagement.

For the component, a plastic injection-molded magnet can advantageously be used, since this magnet is mechanically softer than the shaft.

It is also advantageous that the protrusion is disposed centrally in the component, because as a result the stresses can decrease uniformly all the way around the knurled feature.

BRIEF DESCRIPTION OF THE DRAWINGS

Other features and advantages of the invention will be apparent from the description contained below, taken with the drawings, in which.

DESCRIPTION OF THE PREFERRED EMBODIMENT

Figure 1:
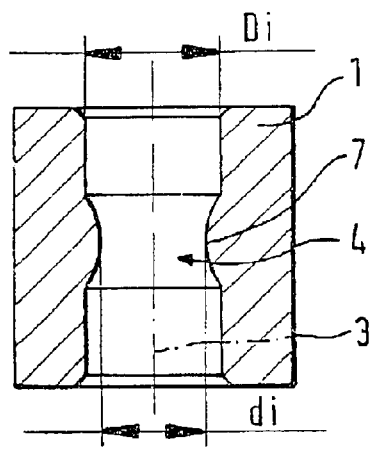
FIG. 1, a component that is used for an armature of the invention.
Figure 2A:
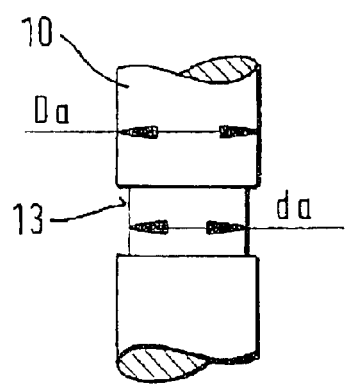
FIG. 2a, b and c, a shaft of the kind used for the armature of the invention, showing how it is produced.

FIG. 1 shows a component 1, which by way of example is a mechanical ball bearing or a plastic injection-molded magnet and which is of a relatively softer material than the shaft 10 (FIG. 2).

The component 1 has a center axis 3, which by way of example can also be the axis of symmetry, and a recess 4, which extends axially in the interior of the component 1. A protrusion 7 is disposed in the axial direction, far instance centrally, in the recess 4 of the component 1; that is, in the outer region of the recess 4, the component 1 has an internal diameter Di, while in the region of the protrusion 7 it has a smaller internal diameter di.

Figure 2B:
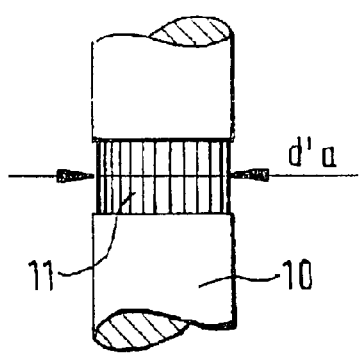
Figure 2C:
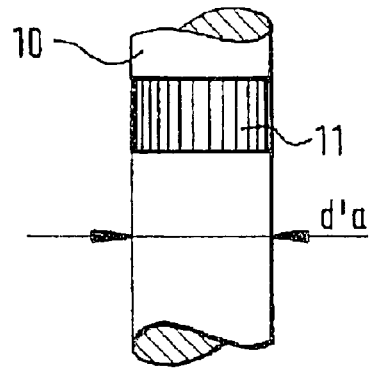

FIG. 2c shows the shaft 10 of the armature of the invention, with an external diameter d'a.

The shaft 10 is produced for instance as follows. In the case of a shaft 10 with an external diameter Da, a plunge cut is made in the region 13 of a later knurled feature 11, and this plunge cut then has a smaller external diameter da (FIG. 2). The knurled feature 11 is made in this region, as shown in FIG. 2b. The knurled feature 11 has an outer diameter d'a. The type of knurled feature is arbitrary. It can comprise longitudinal grooves, transverse grooves, or cross-hatched grooves.

The external diameter Da on the shaft 10 outside the knurled feature 11 is ground down or ground off on a lathe, as needed, such that it is equivalent to the external diameter of the knurled feature 11; that is, the shaft 10 has a constant external diameter d'a. Optionally, a knurled feature 11 that has an external diameter larger than Da is reduced to Da.

The shaft 10 can also be hardened intermittently.

Figure 3:
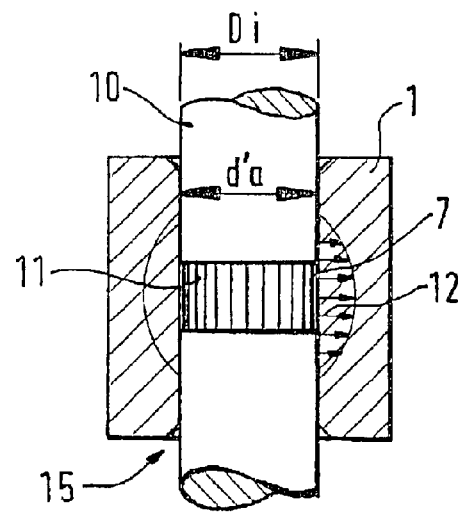
FIG. 3, an armature of the invention in the assembled state.

FIG. 3 shows how the component 1 is secured to the shaft 10. The component 1 has an axial length that is greater than the length of the knurled feature 11.

The internal diameter Di of the component 1 is for instance approximately equivalent to the external diameter d'a of the shaft 10 in FIG. 2c; that is, when the component 1 is initially slipped onto the shaft 10, the component 1 is guided by the shaft 10. There can also be a slight press fit. When the component 1 is slipped farther onto the shaft 10, a stress occurs, or is increased, in the component 1, since the protrusion 7 is slipped onto the shaft 10 outside the knurled feature 11. When the component 1 is displaced farther onto the shaft 10, until the protrusion 7 is disposed in the region of the knurled feature 11, the component 1 is deformed as a result of the press fit in the region of the protrusion 7, since the material comprising the component 1 penetrates the indentations in the knurled feature 11.

When the component 1 is guided by the shaft 10 in the region around the knurled feature 11, no notch stresses occur at the edges of the knurled feature 11; instead, the course of stress is as shown in FIG. 3, with a uniform drop in the stresses in the component 1 in both axial directions around the knurled feature 11. Over the course of time, a stressless state can even occur in the region of the former protrusion 7, and by then the component 1 is secured to the shaft 10 only by positive engagement.

Such an armature 15 can be used for an electric motor or an electric generator and, in a manner not shown, it has a carrier body for at least one coil or permanent magnets and for instance a commutator.

The foregoing relates to preferred exemplary embodiments of the invention, it being understood that other variants and embodiments thereof are possible within the spirit and scope of the invention, the latter being defined by the appended claims.

We claim:

1. An armature for an electrical machine, comprising a shaft having one knurled feature (11) and at least one non-knurled segment (10) having the same external diameter as the knurled feature; and at least one component (1), which is secured to the shaft by the knurled feature by means of a press fit, the component (1) having a center axis (3) and an axially extending recess (4); and a single protrusion (7) continuously extending over the recess (4) with an internal diameter (di) in the protrusion (7), the protrusion (7) being disposed in the region of the knurled feature (11) and projects to form a direct contact with the knurled feature.

2. The armature of claim 1, wherein the component (1) is a plastic injection-molded magnet.

3. The armature of claim 1, wherein the component (1) is a bearing.

4. The armature of claim 1, wherein the protrusion (7) is disposed axially centrally in the component (1).

5. The armature of claim 1, wherein the electrical machine is an electric motor.

6. The armature of claim 1, wherein the electrical machine is an electric generator.

* * * * *